Oct. 29, 1935.  W. C. JOHNSON ET AL  2,018,725
PROCESS OF MAKING COMPOSITE METAL PLATES
Filed June 19, 1933
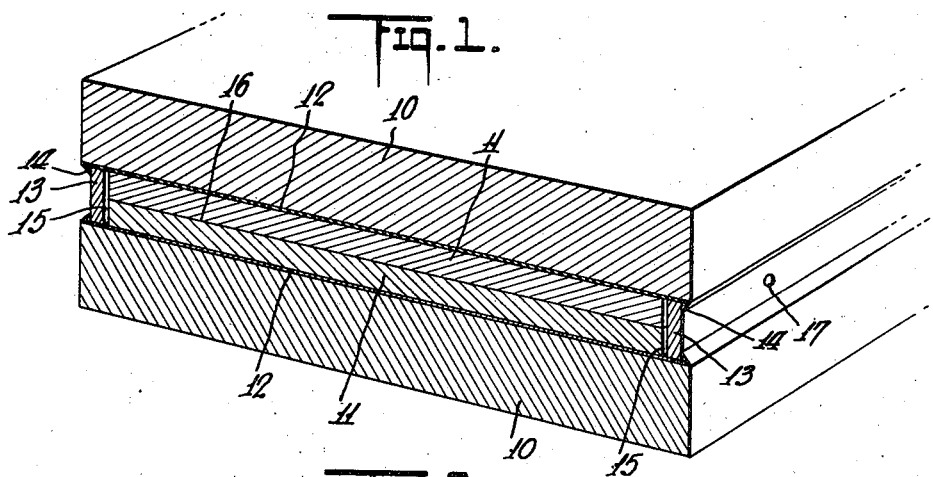
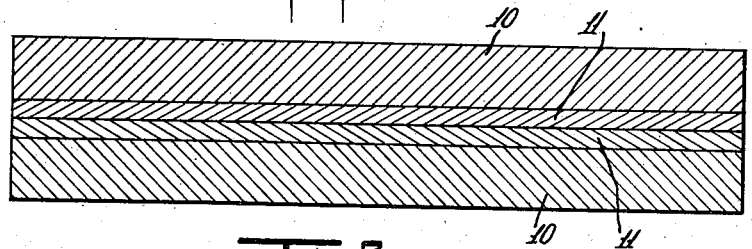
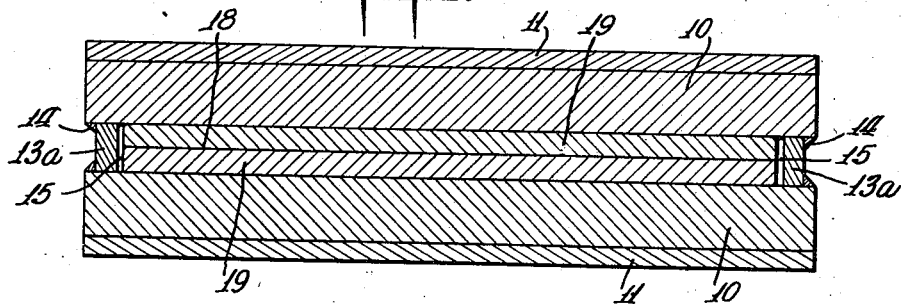
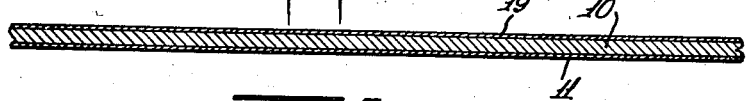
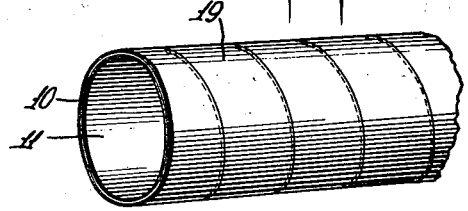
INVENTOR
Alfred E. Maskrey
Wallace C. Johnson
BY
ATTORNEYS Patented Oct. 29, 1935

2,018,725

UNITED STATES PATENT OFFICE 2,018,725

PROCESS OF MAKING COMPOSITE METAL PLATES

Wallace C. Johnson, South Orange, and Alfred E. Maskrey, North Long Branch, N. J., assignors to The Plykrome Corporation, New York, N. Y., a corporation of Delaware Application June 19, 1933, Serial No. 676,476

4 Claims. (Cl. 29—189)

The present invention relates to improvements in process of making composite metal sheets, particularly to sheets provided with corrosion-resistant metal facings on both sides thereof.

The prior patent to Maskrey No. 1,896,411 dated February 7, 1933 discloses a composite metal sheet consisting of a base metal such as mild steel with a relatively thin facing of corrosion-resistant alloy welded to one face thereof. Such corrosion-resistant facing comprises an alloy of the character commonly known as stainless steel, such expression being used broadly to include various alloys of iron and chromium, such as chrome steel, chrome nickel steel, chrome molybdenum steel and similar alloys.

This patent also discloses the manner in which rolled steel plates having a welded facing of corrosion-resistant alloys may be bent into tubular form with the alloy forming either the outer surface or the inner surface of the tube.

A tube or pipe with a lining of corrosion-resistant alloy, such as stainless steel, welded thereto, is particularly well suited for use in a flow line or trunk line pipe through which gases or liquids, such for instance as crude or refined oil, are pumped for long distances. Where such pipe lines are buried in the ground another problem arises, namely, the protection against exterior corrosion of the pipe by the less violent corrosive agents frequently present in the soil.

One phase of our present invention is concerned with the solution of the problem thus presented, and while the provision of such a pipe with an outer welded sheath, also of stainless steel, is within the scope of the present invention, a pipe thus made would be prohibitively expensive for many purposes. On the other hand the electroplating of the outside of the shell with a corrosion-resistant material is impractical because these pipes are very roughly and carelessly handled during transport and installation and a plated outer coating would frequently become so badly scratched that it would present many cracks and crevices through which corrosive agents could attack the pipe.

Furthermore, the corrosive agents commonly present in the soil in most instances do not require such a highly effective corrosion-resistant material as stainless steel. Relatively thin gauge copper, which is a much less expensive and more readily workable metal will adequately serve the purpose.

As one feature of our invention we provide a composite sheet of metal such as mild steel having a stainless steel facing and a copper facing welded to the opposite sides thereof and as a further feature we use these rolled plates in the formation of pipes or tubes wherein the stainless steel serves as the liner to protect the pipe against corrosion by the relatively strong corroding agents which may be present in the fluid transmitted through the pipe and in which the copper facing serves as an outer sheathing to protect the pipe against corrosion by the milder corrosive agents present in the soil.

The manufacture of such a plate also involves inherent difficulties since the temperature required for welding the stainless steel facing in position will in ordinary cases be sufficiently great to actually melt copper.

The Johnson Patent No. 1,886,615 granted November 8, 1932, discloses an improved process of forming composite plates of the type disclosed in the Maskrey patent. This process involves the sandwiching of a pair of corrosion-resistant plates between a pair of slabs of base metal and the interposition between the corrosion-resistant plates of a separator or lubricator. It further discloses means for securing together the edges of the base plates of the sandwich thus formed, during the heating and welding of both corrosion-resistant plates to the steel slabs. It further discloses the subsequent and simultaneous rolling of the connected composite slabs down to any desired thinness and the removal of the connecting means to permit separation of the two composite sheets.

Our present invention is an improvement on the method shown by Johnson, that is to say, the sandwich method of Johnson is employed in the initial stage of our process but after the sandwich has been formed and the plates welded together at a high temperature and partially rolled out, they are separated and reversed and a pair of copper plates interposed between them with a suitable separator or lubricant between the copper plates. With the stainless steel facings thus forming the outer layer of a six ply sandwich and already welded to the steel plates, the entire sandwich unit is subjected to a lower temperature but one sufficient to weld the copper to the steel or base plate as the sandwich is rolled after heating.

During both heating and rolling processes a sealing strip is welded completely around the two base plates and connected to them so that the access of air to the surfaces of the particular corrosion-resistant facing then being rolled and welded is precluded. Furthermore, sufficient space is left between the sealing strips and the edges of the corrosion-resistant plates during this welding operation to accommodate for expansion of the latter.

Entirely aside from the advantages of forming a triple ply composite tubing or piping, a triple ply composite plate embodying a highly corrosion-resistant material on one face thereof and a less effective, but less expensive, corrosion-resistant material on the opposite side of the face thereof finds a wider and varied field of usefulness in the arts and for manufacture into various types of containers and other apparatus.

The invention may be more fully understood from the following description in connection with the accompanying drawing wherein:

Fig. 1 is a fragmentary perspective view showing a pair of stainless steel facing plates sandwiched between a pair of base plates with the sealing strips in position and with a layer of substantially pure iron interposed between the steel plates and the base plates to facilitate welding, Fig. 2 is a transverse sectional view showing the sandwich formation still retained but with the welding and preliminary rolling operations completed and the sealing strips sheared off to permit separation of the two base plates with their welded facings, Fig. 3 illustrates the next step of the process in which the composite plates of Fig. 2 have been reversed, a pair of plates of copper have been sandwiched between the unfaced sides of the base plates, sealing strips have been applied and the six ply sandwich thus formed is ready for rolling and welding, Fig. 4 illustrates the final product after welding of the copper facing has been completed and after the composite plate has been rolled down to the desired thinness, and Fig. 5 is a perspective view illustrating one manner of manufacturing conduits from the plates illustrated in Fig. 4.

Fig. 1 shows a pair of slabs 10 of base metal, typically mild steel and a pair of plates 11 of corrosion-resistant metal of the stainless steel type interposed between the base slabs. Preferably a thin sheet of bond material, such as substantially pure iron 12 is introduced between each plate 11 and its associate slab 10 to promote uniform and firm welding. Since the plates 11 have a greater coefficient of expansion than the slabs 10, the plates are cut smaller than the slabs so that the edges of these alloy plates are spaced inwardly from the edges of the slabs. The slabs are secured together by bars 13 preferably of steel, placed between the edges of the slabs and welded as at 14 to the slabs and to the sheets 11 but not to the alloy plates 12. Sufficient space is left at 15 between the bars 13 and the edges of the alloy plates to permit the expansion of the latter.

Interposed between the adjacent faces of the alloy sheets 11 in order to prevent welding of these faces together or abrasion thereof during rolling, is a lubricant or separator 16 consisting preferably of a non-abrasive pulverulent material having a high melting point. Typical examples of such separators are illustrated in the copending application of Johnson Serial No. 655,739, filed February 8, 1933 and the Johnson patent also discloses the use of suitable separator material.

As explained more fully in the Johnson patent above referred to, it is important to prevent oxidation such as might cause improper welding of the facing plates to the slabs and the strips 13 serve not only to hold all of the layers of the assembly together during heating and rolling but also to seal the edges of the slabs so as to prevent admission of air therebetween.

The air which is between the edges of the plates 11 and the bars 13 when heated from room temperature to a temperature in the order of 1800° to 2200° F. will expand about two hundred times. By providing holes 17 at intervals in the bars 13 and filling these holes with wet fire clay or the like, this clay dries and develops porosity or shrinks sufficiently to form openings or fissures through which the expanding air may escape. Since this air flow is outwardly under pressure, the furnace gases will not pass inwardly through the fire clay.

After the assembly of Fig. 1 has been heated it is hot rolled to weld the plates 11 and slabs 10 together. The metal sandwich is only rolled sufficiently to effect the desired welding, preferably without greatly increasing the width or length of the slabs and their welded facings. Having effected welding, the projecting edges of the slabs together with the bars 13 are trimmed off to produce the structure illustrated in Fig. 2 consisting of two composite slabs with their stainless steel faces in contact with each other and with a lubricant or separator still between the stainless steel sheets.

The composite slabs thus formed are then inverted as illustrated in Fig. 3 so that the welded facing plates 11 are remote from each other and the base slabs 10 adjacent each other. Thereupon a pair of copper plates 19 are sandwiched between the unfaced surfaces of the base slabs 10, a suitable separator 18 being employed between the copper plates. Strips 13a corresponding to the bars 13 are welded in position to secure the parts together and exclude the admission of air to the surface of the copper plates which are to be welded to the base plates. The only distinction in this instance is the fact that the copper will weld readily to the base plate and there is no necessity for using bond sheet such as the pure iron sheet 12 of Fig. 1, to facilitate welding. The assemblage of Fig. 3 is again placed in the furnace and heated to a temperature of approximately 1700° F., removed from the furnace and rolled to effect welding of the copper to the base plates.

This rolling operation may be continued to any extent, Fig. 4 being typical of the extent to which rolling may be carried, showing both the base plate and its two facing members materially reduced in thickness. After the rolling operation has been completed, the projecting edges of the base plate and the stainless steel sheets together with the bars 13 are sheared off to permit ready separation of the two three-ply composite sheets thus formed.

A three-ply sheet thus formed may be bent along longitudinal lines into circular formation to provide a tube having an inner welded lining of stainless steel and an outer welded shield of copper or vice versa. An as alternative to this the three-ply sheets may be cut into strips and spirally wound as illustrated in Fig. 5 such spiral winding being accompanied by edge interlocking (shown in dotted lines at 20) and welding together of the laterally contiguous edges of successive pipe forming convolutions. Such winding, welding and interlocking is a known process typified for example by the patents to Naylor Nos. 1,906,010 and 1,906,011, dated April 25, 1933.

The triple ply sheets formed in accordance with the present invention may be useful in the formation of various other articles where both sides of a container or other device are subject to corrosive attack and particularly where one surface of the article is subject to a more severe attack than the other.

It will thus be seen that we have provided a composite sheet having corrosion-resistant facings on both sides and, while these corrosion-resistant facings may be of similar material, a preferred embodiment of the invention includes corrosion-resistant materials having different corrosion resisting characteristics. Both corrosion-resistant facings are sufficiently thick and tough to prevent exposure of the base metal between them by scratching or abrasion of such facings.

The herein described method is applicable to the formation of welded multi-ply composite sheets or slabs of various kinds and the particular three-ply sheet material is capable of production by other methods.

Having thus described our invention, what we claim as new and desire to secure by Letters Patent is:—

1. The process of making three-ply composite metal sheets or plates having corrosion-resistant facings which includes forming a pile in which a pair of corrosion-resistant metal plates are sandwiched between two base metal slabs, welding the slabs together along the edges thereof, heating the pile, rolling the pile, cutting off the welded edges, reversing the position of the slabs to present the welded faces outermost, sandwiching a second pair of metal sheets having a lower melting point than said plates of corrosion-resistant metal between the unfaced surfaces of the slabs, rewelding the edges of the slabs together, reheating the pile to a lower temperature than said first mentioned heating, rolling the pile down to the desired thickness and trimming off the welded edges.

2. The process of making three-ply composite metal sheets or plates having corrosion-resistant facings which includes forming a pile in which a pair of corrosion-resistant metal plates are sandwiched between two base metal slabs, welding the slabs together along the edges thereof without welding the plates together, heating the pile, rolling the pile, cutting off the welded edges, reversing the position of the slabs to present the corrosion-resistant plates outermost, sandwiching a pair of copper sheets between the unfaced surfaces of the slabs, rewelding the edges of the slabs together along lines spaced from the edges of the sandwiched plates, reheating the pile to a lower temperature than that reached in the preceding heat treatment, rolling the pile down to the desired thickness and cutting off the welded edges.

3. The process of making three-ply composite metal sheets or plates having corrosion-resistant facings which includes forming a pile in which a pair of stainless steel plates are sandwiched between two base metal slabs, welding the slabs together along the edges thereof, heating the pile to temperature which would melt copper, rolling the pile, cutting off the welded edges, reversing the position of the slabs to present the welded faces outermost, sandwiching a pair of copper plates between the unfaced surfaces of the slabs, rewelding the edges of the slabs together, reheating the pile to temperature below the melting point of copper, rolling the pile down to the desired thickness and cutting off the welded edges.

4. The process of making three-ply composite metal sheets or plates having corrosion-resistant facings which includes applying a corrosion-resistant metal plate to a base metal slab, heating and pressure welding the plate and slab together, applying a copper plate to the opposite surface of the slab, heating to a lower temperature than the previous heating, pressure welding the copper to the slab, and rolling the three plies down to a materially reduced thickness.

WALLACE C. JOHNSON.
ALFRED E. MASKREY.